Sept. 7, 1937.  W. G. COOK  2,092,051
MOTOR CONTROL SYSTEM
Filed Sept. 12, 1934  2 Sheets-Sheet 1
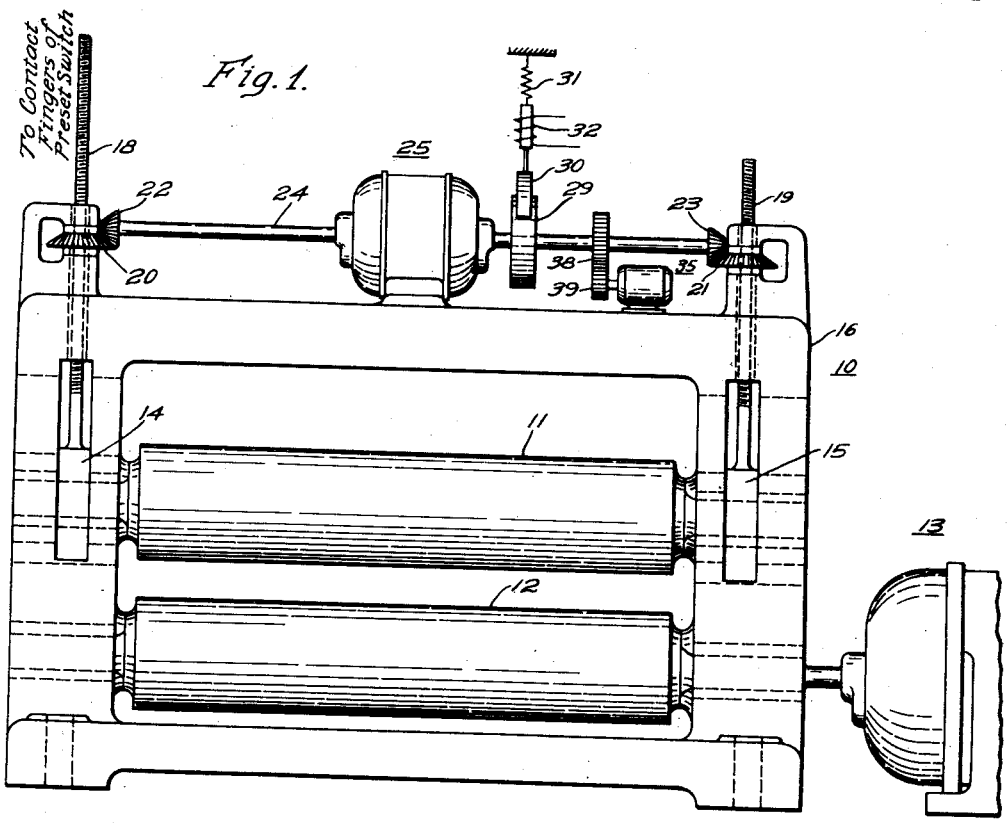
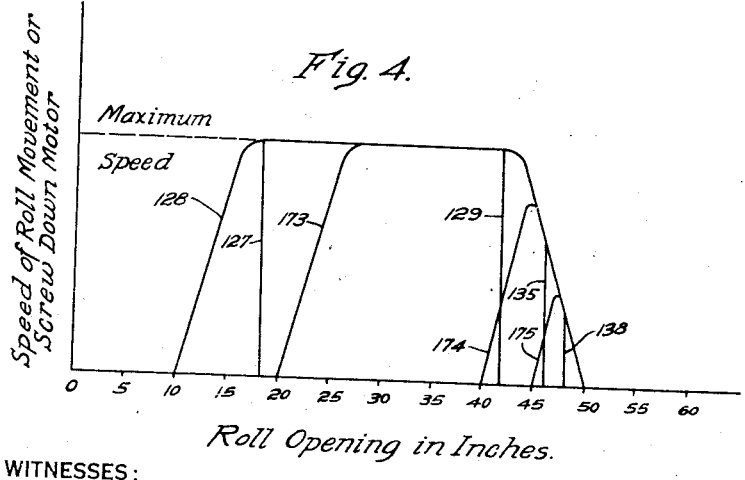
WITNESSES:
C. J. Weller
R. R. Lockwood
INVENTOR
Willard G. Cook.
BY
G. M. Crawford
ATTORNEY

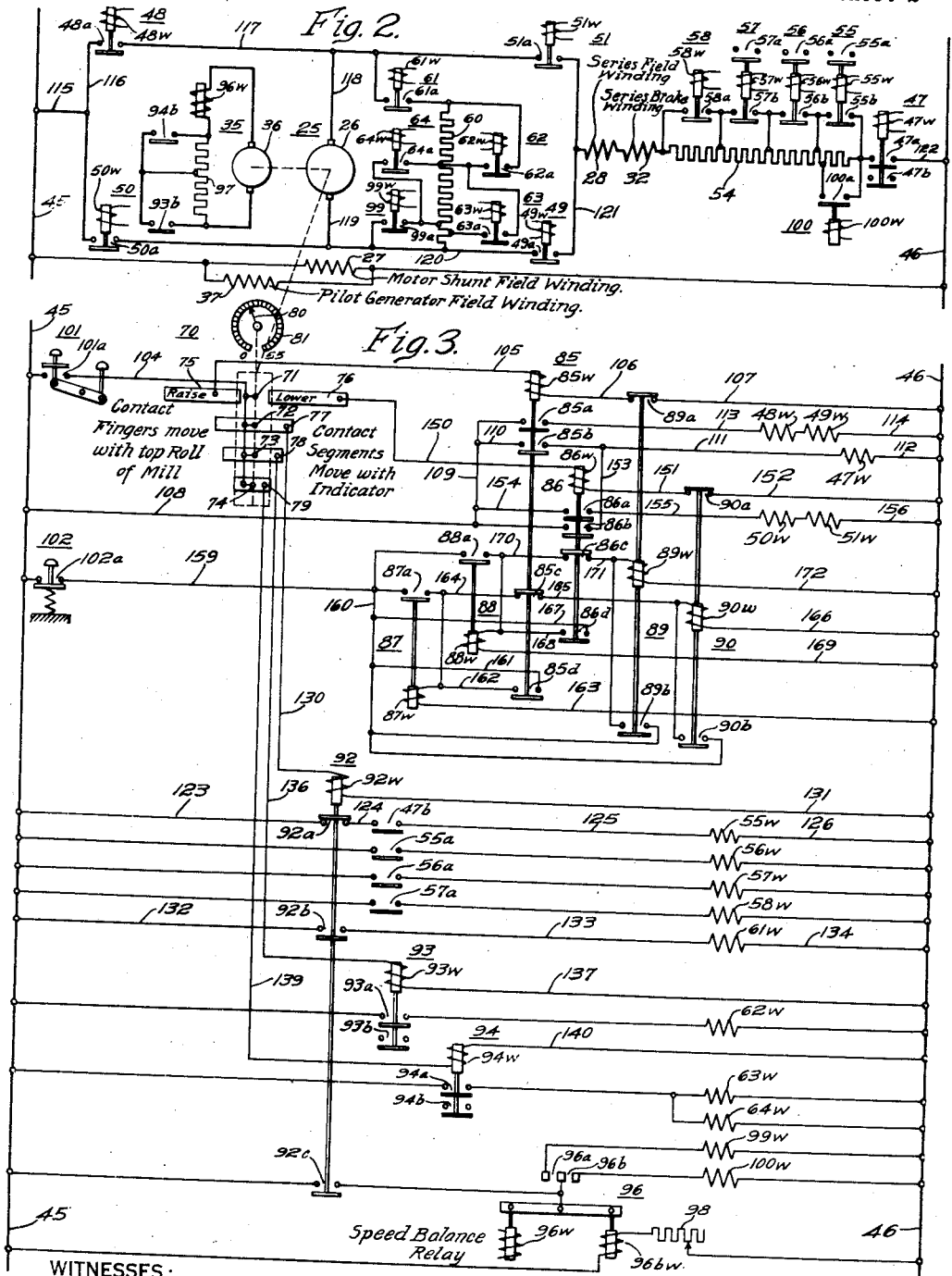

Patented Sept. 7, 1937

2,092,051

UNITED STATES PATENT OFFICE 2,092,051

MOTOR CONTROL SYSTEM

Willard G. Cook, Forest Hills, Pa., assignor to Westinghouse Electric & Manufacturing Company, East Pittsburgh, Pa., a corporation of Pennsylvania Application September 12, 1934, Serial No. 743,689

17 Claims. (Cl. 80—56)

My invention relates, generally, to systems for controlling electric motors and it has particular relation to such systems for controlling the relative movement of rolls in a steel rolling mill.

In the motor control systems of the prior art, such as are described in Patent No. 1,764,312 to Jenks, which is assigned to the assignee of this application, means are provided for presetting the relative positions of the rolls, after which the rolls are automatically moved to the desired position. In order to increase the production of the mill, to employ the expensive rolling equipment at its maximum capacity, and to handle the hot metal at a high rate of speed, it is highly desirable that the change in the relative position of the rolls take place at the highest possible speed or during the shortest possible time interval.

In order to accomplish the high speed of roll movement, it is necessary to accelerate the screw-down motor which adjusts the relative position of the rolls to its maximum speed at the highest rate which can be achieved taking into consideration the inertia of the system and its physical limitations. It is also necessary to decelerate the screw-down motor at the highest possible rate in order that the rolls be brought to their final relative position within a minimum time interval.

In the prior art, the control of the screw-down motor has been based on conditions of the mill as being substantially fixed. In a given adjustment of the control system, it is assumed that the time required for the rolls to change from one relative position to another will take place in the same length of time regardless of whether the change takes place successively within an hour, a day or a week. The systems of the prior art have not taken into consideration the fact that the screw-down mechanism may be operating under widely varying conditions, such for example as in cold weather, when the lubricant in the screw-down mechanism may be considerably more viscous than it will be in warm weather. The threads of the lead screws may also become worn and thus render the friction in the system variable.

The time for decelerating from the maximum speed when beginning a series of rolling operations may be considerably different after the mill has been in operation for several hours. It has been necessary in the prior art to individually change the adjustment for each final position for decelerating the screw-down motor in order that the final desired position may be attained with a minimum of delay, and further, that it may not be over- or under-shot.

In certain instances, it is desirable to move the rolls only through a very small distance, during the time required for which the screw-down motor cannot be accelerated to the maximum speed. It is, however, desirable to carry out this operation during a minimum of time and, therefore, it is desirable to have the screw-down motor accelerate to as high a speed as is consistent with stopping at the desired position.

In the systems of the prior art, the deceleration of the screw-down motor has been effected in predetermined steps without regard to the particular speed at which the screw-down motor operates in each step. Thus, if there is considerable friction in the screw-down mechanism due to the persence of a heavy lubricant or worn threads or the like, the screw-down motor may decelerate at a higher rate than is desirable, thereby causing it to possibly under-shoot the final position or to require an unduly long time for it to reach the final position due to the last low speed step at which the screw-down motor is caused to slowly move the rolls to their final relative position.

The object of my invention, generally stated, is to provide a motor control system for the screw-down motor of a rolling mill which shall be simple and efficient in operation and which may be readily and economically manufactured and installed.

The principal object of my invention is to provide for moving the rolls of a rolling mill from one relative position to another in a minimum time.

An important object of my invention is to provide for controlling the operation of a screw-down motor for rolling mills.

A still further important object of my invention is to provide for decelerating the screw-down motor of a rolling mill at a predetermined rate, regardless of variable conditions in the screw-down mechanism.

Another object of my invention is to provide for controlling the speed of a screw-down motor for rolling mills in accordance with the distance the rolls, moved thereby, are from the final position.

Still another object of my invention is to provide for reducing the speed of a screw-down motor for rolling mills in a plurality of steps and maintaining the speed thereof for each step substantially constant.

Other objects of my invention will in part be obvious and, in part, appear hereinafter.

My invention accordingly is disclosed in the embodiment hereof shown in the accompanying drawings and comprises the features of construction, combination of elements and arrangements of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which Figure 1 is a view side elevation of the roll stand of a rolling mill, the screw-down motor of which may be controlled in accordance with my invention;

Fig. 2 illustrates diagrammatically the system which may be used for controlling the operation of the screw-down motor shown in Fig. 1;

Fig. 3 illustrates diagrammatically the circuit connections for the control system illustrated in Fig. 2; and Fig. 4 shows a number of curves which demonstrate the functioning of the control system organized in accordance with my invention.

In order to decelerate the screw-down motor of a rolling mill from its maximum operating speed to stop it at the final desired position, I have provided a plurality of deceleration steps, in each of which the screw-down motor is connected to the power source under different circuit conditions, each successively causing the screw-down motor to operate at a speed lower than that of the preceding step. The speed reduction is accomplished by inserting a resistor in series circuit relation with the motor armature and by connecting an additional resistor in shunt circuit relation to further decrease the speed. In the event that the speed in any step is higher than a certain predetermined speed for that particular step, the effective resistance of the resistor which is connected in shunt circuit relation with the armature of the motor is automatically decreased, in order to correspondingly reduce the speed of the motor. In like manner, if the speed of the motor during any step is less than the predetermined speed for that particular step, a certain portion of the resistance connected in series circuit relation with the armature of the screw-down motor is removed from the circuit thereby increasing the operating voltage which is applied to the armature and increasing the speed thereof until the predetermined speed is obtained.

The automatic control of the speed of the screw-down motor during any step is obtained by means of a speed-balance relay, which, in turn, is controlled in accordance with a voltage which is proportional to the speed of the screw-down motor. In this modification of the invention, a pilot generator is driven by the screw-down motor, the voltage of which, it will be readily understood, will be directly proportional to the speed of the screw-down motor. The speed-balance relay is provided with an operating winding which is connected to be responsive to the voltage of the pilot generator. The voltage which is applied to the operating winding of the speed-balance relay is also controlled in accordance with the step in the sequence of deceleration at which the screw-down motor is operating so that substantially the same voltage is continually applied to the operating winding.

A limit switch, which may be preset by the operator and which is also controlled by the movement of the top roll of the mill or the screw-down motor, serves to cause the screw-down motor to decelerate in the predetermined steps beginning at a predetermined distance from the point where it is desired to finally stop the roll.

For a more detailed description of the functioning and novel features of my invention, reference may be had to the drawings, with particular reference to Fig. 1 thereof, in which the reference character 10 designates, generally, the roll stand of a rolling mill provided with upper and lower rolls 11 and 12, respectively, the lower roll 12 being arranged to be driven by means of a drive motor 13. As is the customary practice, the upper roll 11 is movable relative to the lower roll 12, its bearings being mounted in blocks 14 and 15, which are slidably mounted in a frame 16 of the roll stand 10. The blocks 14 and 15 are raised and lowered and the upper roll 11 correspondingly moved by means of lead screws 18 and 19, which are threadably mounted in bevel gears 20 and 21, respectively. The bevel gears 20 and 21 engage bevel gears 22 and 23 which may be mounted on a shaft 24 that is disposed to be driven by means of a screw-down motor, shown generally at 25.

The screw-down motor 25 may be of conventional compound wound type having an armature 26, Fig. 2, a shunt field winding 27 and a series field winding 28.

In order to quickly bring the shaft 24 to rest, a brake wheel 29 is provided thereon with which a brake shoe 30 is disposed to engage under the force of a compression spring 31. The brake shoe 30 may be released from engagement with the brake wheel 29 by means of a series brake winding 32 which, as shown in Fig. 2 of the drawings, is arranged to be connected in series circuit relation with the series field winding 28 in the customary manner. When the screw-down motor 25 is energized to operate in either direction, the series brake winding 32 will be energized, as will be readily understood, and the brake will be released.

In order to obtain a measure of the speed of the screw-down motor 25, a pilot generator 35 is provided having an armature 36, Fig. 2, and a separately excited field winding 37. The pilot generator 35 is arranged to be driven, as illustrated in Fig. 1, through spur gears 38 and 39, the gear 38 being mounted directly on the shaft 24, while the gear 39 is arranged to drive the armature 36. While the pilot generator 35 is provided in order to obtain an indication of the speed of the screw-down motor 25, it will be apparent that the voltage across the terminals of the armature 26 may be employed in order to furnish an indication of the speed of the screw-down motor for a purpose which will be set forth hereinafter.

Referring now particularly to Figs. 2 and 3 of the drawings, it will be observed that the screw-down motor 25 is arranged to be connected between energized conductors 45 and 46. A portion of the control apparatus for controlling the functioning of the screw-down motor 25 is shown in Fig. 2. The detail circuit connections for the operating windings, however, are shown in Fig. 3, in order to reduce the circuit complications to a minimum and to more clearly illustrate the invention.

The armature 26, series field winding 28 and series brake winding 32 are disposed to be connected to the energized conductors 45 and 46 by means of a line switch 47 and two pairs of reversing switches 48, 49, and 50, 51. When the reversing switches 48 and 49 are closed, the screw-down motor 25 will be energized to raise the upper roll 11 and when the reversing switches 50 and 51 are energized, the screw-down motor 25 will be operated to move the upper roll 11 downwardly or to lower it.

In order to initially connect the armature 25 to the energized conductors 45 and 46, the customary starting resistor 54 is provided which may be shunted by means of accelerating switches 55 through 58. As each accelerating switch is energized, it completes a circuit for energizing the next succeeding accelerating switch. In certain instances, it may be desirable to provide for a time delay between the successive functioning of the accelerating switches. However, under normal operation the time delay which is inherent in the functioning of the accelerating switches is sufficient to provide the required time interval for properly accelerating the screw-down motor 25.

When the screw-down motor 25 has been accelerated to the maximum speed, the armature 26, series field winding 28 and series brake winding 32 are connected directly between the energized conductors 45 and 46. Since it is desired to reduce the speed of the screw-down motor from the maximum speed to zero during the shortest possible time on approaching the final position at a predetermined distance therefrom, the series resistor 54 is reconnected into the circuit and a shunting resistor 60 is connected by means of a shunting switch 61 in shunt circuit relation with the armature 26. This circuit connection provides for dynamically braking the armature 26 and slowing it down at a very rapid rate. In order to further increase the dynamic braking effect, additional decelerating switches 62, 63, and 64 are provided, which are arranged to reduce the resistance which is connected in parallel circuit relation with the armature 26.

As has been set forth hereinbefore, the object of this invention is to provide for adjusting the relative position of the upper and lower rolls 11 and 12 in accordance with the thickness of the next pass which it is desired to roll. In order to preset the desired roll position, a limit switch, shown generally at 70, is provided having contact fingers 71 through 74 which may be movable in accordance with the movement of the upper roll 11. As is illustrated in Fig. 1 of the drawings, the lead screw 18 may be extended to control the movement of the contact fingers 71 through 74 in any suitable manner, it being understood, however, that they are all moved in unison.

The limit switch 70 is also provided with raise and lower contact segments 75 and 76, which are arranged to determine the direction of rotation of the screw-down motor 25. Deceleration contact segments 77, 78, and 79 are also provided in the limit switch 70 and are arranged to control the operation of the screw-down motor 25, as it is being decelerated.

As illustrated in the drawings, the contact segments 75 through 79 are arranged to engage the contact fingers 71 through 74. It will also be observed that the contact segments 75 through 79 are arranged to be moved in unison by means of an indicator 80 which has cooperating therewith a scale 81, the divisions of which correspond to various openings between the upper and lower rolls 11 and 12.

While the contact fingers 71 through 74 have been illustrated and described herein as being movable with the top roll of the mill or with the movement of the screw-down motor 25, and the contact segments 75 through 79 have been illustrated as being movable with the indicator 80, it will be readily understood that these functions may be reversed and that the contact fingers may be caused to move with the indicator 80 and the contact segments may be moved with the upper roll 11 or the screw-down motor 25 without departing from the scope of this invention.

The raise contact segment 75 is arranged to effect the energization of the operating winding $85w$ of a raise relay 85 which operates to effect the operation of the main switch 47 and the reversing switches 48 and 49. In like manner, the lower contact segment 76 is arranged to energize the operating winding $86w$ of a lower relay 86, which, in turn, effects the operation of the main switch 47 and the reversing switches 50 and 51.

With a view to preventing the screw-down motor 25 from hunting, or over-shooting, the final position more than a predetermined number of times, anti-hunting relays 87 through 90 are provided, the functioning of which will be set forth in detail hereinafter.

When the upper roll 11 is moved to within a predetermined distance of its final position, decelerating relays 92, 93, and 94 are successively operated by means of the decelerating contact segments 77, 78, and 79, respectively, coming into contact engagement with the contact fingers 72, 73, and 74. The deceleration relays 92, 93, and 94 successively cause the series resistor 54 to be inserted in series circuit relation with the armature 26 and various steps of the shunting resistor 60 to be connected in shunt circuit relation therewith.

As has been set forth hereinbefore, it is desirable to maintain the speed of the screw-down motor 25 at the speed which corresponds to the particular step of the control sequence at which it is operated. For this purpose, a speed-balance relay, shown generally at 96, is provided having an operating winding $96w$ which is arranged to be connected through a resistor 97 across the terminals of the armature 36 of the pilot generator 35. As illustrated, the speed-balance relay 96 may be of the walking beam type having a biasing winding $96bw$, which is arranged to balance the force exerted by the operating winding $96w$. An adjustable resistor 98 is provided, as illustrated, in series circuit relation with the biasing winding $96bw$ in order to vary the current flow therethrough. It will be understood, however, that a spring may be provided instead of the biasing winding $96bw$ which may be made adjustable and the speed-balance relay 96 will operate equally satisfactorily and without departing from the scope of this invention.

When the speed of the screw-down motor 25 is greater than that at which it is desired to operate it in any particular step of deceleration, a decelerating switch 99 is operated to further decrease the resistance which is connected in parallel circuit relation with the armature 26. This functioning is effected by connecting the operating winding $99w$ of the decelerating relay 99 to the energized conductors 45 and 46 through the contact members $96a$ of the speed-balance relay.

In like manner, if the speed of the screw-down motor 25 is lower than that for which the control system is adjusted in any particular step, an accelerating switch 100 is provided which is arranged to reduce the resistance of the series resistor 54, that is connected in series circuit relation with the armature 26. A higher voltage is then applied to the armature 26 and a corresponding increase in speed results. This functioning is controlled by means of the contact members 96b of the speed-balance relay 96 which are connected to control the energization of the operating winding 100w of the accelerating relay 100.

In order to initially place the system in operation a start switch 101 is provided which is arranged to be maintained in the operated position as long as the rolling operations are being performed. The movement of the upper roll 11 from one position to another is individually initiated after the first operation by means of a next-pass switch 102, the contact members of which are normally closed. When this switch 102 is operated to open its contact members 102a, the upper roll 11 is automatically moved to a position which corresponds to the setting of the indicator 80 with respect to the scale 81.

In setting forth the operation of the herein described motor control system, it will be assumed that the conductors 45 and 46 are properly energized and that all of the switches and relays are in the positions illustrated in the diagrams shown in Figs. 2 and 3.

The operator first adjusts the indicator 80 to the position corresponding to the opening between the rolls 11 and 12 which is desired for the first pass. It will be assumed that the operator desired to move the rolls from a 10 inch opening to a 50 inch opening. The indicator 80 is, therefore, set to the 50 inch position on the dial 81. A corresponding movement of the contact segments 75 through 79 is caused by this movement of the indicator 80 so that only the raise contact segment 75 will be in engagement with the contact finger 71. The decelerating contact segments 77, 78, and 79 will be moved entirely out of engagement with their corresponding contact fingers 72, 73, and 74.

The operator then depresses the start switch 101 to initially effect the energization of the operating winding 85w of the raise relay 85. The operation of the raise relay 85, in turn, effects the energization of the operating winding 47w of the main switch 47 and also the energization of the operating windings 48w and 49w of the reversing switches 48 and 49, respectively. The armature 26, series field winding 28 and series brake winding 32 are then connected through the series resistor 54 between the energized conductors 45 and 46. The brake shoe 30 is removed from engagement with the brake wheel 29 and the screw-down motor 25 is operated to move the roll 11 upwardly.

The circuit for energizing the operating winding 85w of the raise relay 85 may be traced from the energized conductor 45 through contact members 101a of the start switch 101, conductor 104, contact finger 71, raise contact segment 75, conductor 105, operating winding 85w, conductor 106, contact members 89a and conductor 107 to the energized conductor 46. The circuit for energizing the operating winding 47w of the line switch 47 may be traced from the energized conductor 45 through conductors 108, 109, and 110, contact members 85b, conductor 111, operating winding 47w and conductor 112 to the energized conductor 46. The circuit for energizing the operating windings 48w and 49w may be traced from the energized conductor 45 through conductors 108 and 109, contact members 85a, conductor 113, operating windings 48w and 49w and conductor 114 to the energized conductor 46.

The circuit for energizing the armature 26, series field winding 28 and series brake winding 32 may be traced from the energized conductor 45 through conductors 115 and 116, contact members 48a, conductors 117 and 118, armature 26, conductors 119 and 120, contact members 49a, conductor 121, series field winding 28, series brake winding 32, resistor 54, contact members 47a and conductor 122 to the energized conductor 46.

The operation of the line switch 47 completes at contact members 47b a circuit for energizing the operating winding 55w of the accelerating switch 55. The operation of this switch, in turn, at its contact members 55a completes a circuit for effecting the energization of the operating winding 56w of the next accelerating switch 56. In like manner, the remaining accelerating switches 57 and 58 are operated to successively cut out of the circuit sections of the series resistor 54 by means of the successive closing of contact members 55b, 56b, 57b, and 58a.

The circuits for energizing the operating winding of the accelerating switch 55w may be traced from the energized conductor 45 through conductor 123, contact members 92a, conductor 124, contact members 47b, conductor 125, operating winding 55w and conductor 126 to the energized conductor 46. The circuits for energizing the operating windings 56w, 57w, and 58w are obvious and will not be traced.

With all of the steps of the series resistor 54 removed from the circuit, the screw-down motor 25 will operate at its maximum speed which may be represented in Fig. 4 by the ordinate 127 that intercepts the curve 128 showing the speed of movement of the upper roll 11 in relation to the roll opening. It will be understood that the first part of the curve 128 which rises rapidly indicates the acceleration of the movement of the upper roll 11 or the increase in speed of rotation of the armature 26 of the screw-down motor 25.

The screw-down motor 25 continues to operate at the maximum speed, as illustrated by the curve 128, until the upper roll 11 approaches to within a predetermined distance of its final stopping point. This may be represented by the ordinate 129 which, for illustration, indicates that this point is reached when the roll 11 attained the 42 inch opening. At this time, the decelerating contact segment 77 engages the contact finger 72. It will be understood, however, that the distance from the final stopping point at which the decelerating contact segment 77 engages the contact finger 72 may be altered in accordance with operating conditions. In like manner, the corresponding distances from the final stopping point at which the succeeding decelerating contact segments 78 and 79 engage the contact fingers 73 and 74 may also be varied in accordance with operating conditions in order to obtain the maximum feasible rate of deceleration of the motor 25.

The engagement of the contact segment 77 with the contact finger 72 completes a circuit for energizing the operating winding 92w of the decelerating relay 92. As a result, contact members 92a are opened, thereby opening the energizing circuit to the operating winding 55w of the accelerating switch 55. The accelerating switch 55 thereupon opens and at its contact members 55a, opens the energized circuit for the operating winding 56w of the next accelerating switch. In like manner, the remaining operating windings 57w and 58w of the accelerating switches 57 and 58 are deenergized. It will be understood that the series resistor 54 is again connected in series circuit relation with the armature 26 and series field winding 28 of the screw-down motor 25.

The circuit for energizing the operating winding 92w may be traced from the energized conductor 45 through contact members 101a, conductor 104, contact finger 72, contact segment 77, conductor 130, operating winding 92w, and conductor 131 to the energized conductor 46.

Although the insertion of the resistor 54 tends to reduce the speed of the screw-down motor 25, it is desirable to reduce it further. For this reason, the operating winding 61w of the decelerating switch 61 is energized by the operation of the decelerating relay 92. The decelerating switch 61 connects, at its contact members 61a, the resistor 60 in shunt circuit relation with the armature 26.

The circuit for energizing the operating winding 61w may be traced from the energized conductor 45 through conductor 132, contact members 92b, conductor 133, operating winding 61w and conductor 134 to the energized conductor 46. The circuit for shunting the armature 26 may be traced through conductors 118 and 117, contact members 61a, the resistor 60 and conductors 120 and 119 back to the armature 26.

The operation of the decelerating relay 92 also initiates the functioning of the speed-balance relay 96 to further control the speed of the screw-down motor 25. The screw-down motor 25 now tends to run at a speed which is between the speeds represented by the ordinates 129 and 135, Fig. 4. At this speed, the pull exerted by the operating winding 96w, as energized from the pilot generator 35, will equal the pull which is exerted by the biasing winding 96bw. As a result contact members 96a and 96b will be open. However, in the event that the speed of the screw-down motor 25 is above or below this speed either the one or the other of these sets of contact members will be closed to effect the energization of either the operating winding 99w or 100w, as the case may be, to correspondingly decrease or increase the speed of the screw-down motor 26 until it reaches the predetermined speed for this deceleration step.

Assuming that the speed of the screw-down motor 25 is below that corresponding to the first step of deceleration which may be caused by cold lubricant in the screw-down mechanism, exceptionally high friction or the like, then the voltage which is generated by the pilot generator 35 will be correspondingly below the voltage which would be generated if the screw-down motor 25 were operating at the correct speed. Therefore, the pull of the biasing winding 96bw will overcome that of the operating winding 96w and contact members 96b will be closed completing an obvious energizing circuit for the operating winding 100w for the accelerating switch 100. This switch on closure completes at contact members 100a, a circuit for shunting a portion of the series resistor 54, thereby increasing the voltage which is applied to the armature 25.

Had the speed of the screw-down motor 25 been above that corresponding to the first step of deceleration, the voltage applied to the operating winding 96w by the pilot generator 35 would have been such as to cause the pull exerted by the operating winding 96w to overcome the pull exerted by the biasing winding 96bw. As a result, contact members 96a are closed thereby completing an obvious energizing circuit for the operating winding 99w of the decelerating switch 99. The operation of the deceleration switch 99 completes at the contact members 99a, a circuit for shunting a portion of the resistor 60 which is effective to further decrease the speed of the screw-down motor 25 to such an extent that it is rapidly reduced to the speed corresponding to the first step of deceleration.

The continued operation of the screw-down motor 25 causes the deceleration contact segment 78 to engage the contact finger 73, thereby completing a circuit for energizing the operating winding 93w of the decelerating relay 93. The operation of the deceleration relay 93 in turn completes an obvious energizing circuit at contact members 93a for the operating winding 62w of the decelerating switch 62. The operation of the deceleration switch 62 short circuits a portion of the resistor 60, thereby decreasing the resistance which is connected in shunt circuit relation to the armature 26 and increasing the dynamic braking effect.

The circuit for energizing the operating winding 93w may be traced from the energized conductor 45 through contact members 101a, conductor 104, contact finger 73, contact segment 78, conductor 136, operating winding 93w, and conductor 137 to the energized conductor 46.

The operation of the deceleration relay 93 also completes at contact members 93b a circuit for shirt circuiting a portion of the resistor 97. Since the speed at which the motor 25 tends to run when the contact segments 77 and 78 are in engagement with the contact fingers 72 and 73 is between that represented by the ordinates 135 and 138, the voltage generated by the pilot generator 35 will be correspondingly less. In order that the speed-balance relay 96 may be caused to balance at this new speed, it is necessary to maintain the normal voltage which is applied to the operating winding 96w at the same value regardless of the speed of the screw-down motor, as reflected in the voltage generated by the pilot generator 35.

The operation of the speed-balance relay 96 will now be the same as described previously and it will alternately operate the switches 99 and 100 as is required to restore the speed of the screw-down motor 25 to that which corresponds to the number of deceleration contact segments which are in engagement with the contact fingers.

The further continued operation of the screw-down motor 25 finally causes the last deceleration contact segment 79 to engage the contact finger 74. The operating winding 94w of the decelerating relay 94 is then energized and, as a result, the contact members 94a complete an obvious energizing circuit for the operating windings 63w and 64w of the deceleration switches 63 and 64. The operation of these switches, respectively, at contact members 63a and 64a, short circuits all but the final step of the resistor 60, thereby further slowing down the screw-down motor 25 to a position which is between that represented by the ordinate 138 and zero.

The circuit for energizing the operating winding 94w may be traced from the energized conductor 45 through the contact members 101a, conductor 104, contact finger 74, contact segment 79, conductor 139, operating winding 94w, and conductor 140 to the energized conductor 46.

The decelerating switch 64 is provided in order to permit the decelerating switch 99 in the last step of the deceleration sequence to completely short circuit the armature 26 in the event that the speed thereof is above that corresponding to the last step of deceleration.

The deceleration relay 94 also completes at contact members 94b a circuit for shunting the final portion of the resistor 97 so that the operating winding 96w of the speed-balance relay may be connected directly across the armature 36 of the pilot generator 35. This circuit, as has been set forth hereinbefore, is provided in order to change the speed at which the speed-balance relay 96 is arranged to balance to correspond to the speed in the last step of the deceleration sequence.

The continued operation of the screw-down motor 25 finally causes the raise contact segment 75 to move out of engagement with the contact finger 71, thereby opening the energizing circuit to the operating winding 85w of the raise relay 85. The operating winding 47w of the main switch 47 and the operating windings 48w and 49w of the reversing switches 48 and 49 are then deenergized, and the brake shoe 30 is applied to the brake wheel 29.

Ordinarily the speed with which the screw-down motor 25 is brought to rest is such that the final position, in this case the 50 inch opening, is over-shot and the lower contact segment 76 is caused to engage the contact finger 71. The operating winding 86w of the lower relay 86 is then energized and, as a result, the operating winding 47w of the main switch and operating windings 50w and 51w of the reversing switches 50 and 51, respectively, are energized to operate the screw-down motor 25 in a reverse direction.

The circuit for energizing the operating winding 86w may be traced from the energized conductor 45 through contact members 101a, conductor 104, contact finger 71, contact segment 76, conductor 150, operating winding 86w, conductor 151, contact members 90a and conductor 152 to the energized conductor 46. The circuit for energizing the operating winding 47w may be traced from the energized conductor 45 through conductor 108, contact members 86b, conductors 153 and 111, operating winding 47w and conductor 112 to the energized conductor 46. The circuit for energizing the operating windings 50w and 51w may be traced from the energized conductor 45 through conductors 108, 109 and 154, contact members 86a, conductor 155, operating windings 50w and 51w and conductor 156 to the energized conductor 46.

It is desirable, however, to prevent the hunting of the screw-down motor 25 above and below the final position and, as a result, the anti-hunting relays 87 through 90 are provided, as has been set forth hereinbefore. These relays are so arranged that the screw-down motor 25 is arranged to be energized only once in a reverse direction after it has been deenergized. Their functioning is set forth in the following paragraphs.

When the raise relay 85 is first operated, a circuit is completed at contact members 85d for effecting the energization of the operating winding 87w of the relay 87. This relay, when operated, completes a holding circuit for itself which is only released when the next-pass switch 102 is opened. When the raise relay 85 is returned to the non-operated position, a circuit is completed at contact members 85c for energizing the operating winding 90w of the relay 90. This, however, does not take place until after the lower relay 86 has once been operated to reverse the direction of rotation of the screw-down motor 25. The operation of the relay 90 opens, at contact members 90a, the energizing circuit for the operating winding 86w of the lower relay 86, thereby preventing its subsequent energization until the relay 90 is restored to its normal position.

The circuit for energizing the operating winding 87w may be traced from the energized conductor 45 through the contact members 102a, conductors 159, 160, and 161, contact members 85d, conductor 162, operating winding 87w and conductor 163 to the energized conductor 46. The relay 87 completes at contact members 87a an obvious holding circuit for the operating winding 87w. The circuit for energizing the operating winding 90w may be traced from the energized conductor 45 through contact members 102a, conductor 159, contact members 87a, conductor 164, contact members 85c, conductor 165, operating winding 90w and conductor 166 to the energized conductor 46. At contact members 90b, an obvious holding circuit is completed for the operating winding 90w.

When the lower relay 86 is operated, a circuit is completed at contact members 86d for energizing the operating winding 88w of the relay 88. This relay, on operating, completes a holding circuit for itself and, when the lower relay 86 is restored to the non-operated position, a circuit is completed for energizing the operating winding 89w of the relay 89. The operation of this relay opens at contact members 89a the energizing circuit for the operating winding 85w for the raise relay 85 and prevents its subsequent operation until the relay 89 is restored to the non-operated position.

The circuit for energizing the operating winding 88w may be traced from the energized conductor 45 through contact members 102a, conductors 159, 160, and 167, contact members 86d, conductor 168, operating winding 88w and conductor 169 to the energized conductor 46. An obvious holding circuit is completed at contact members 88a for the operating winding 88w. The circuit for energizing the operating winding 89w may be traced from the energized conductor 45 through contact members 102a, conductors 159 and 160, contact members 88a, conductor 170, contact members 86c, conductor 171, operating winding 89w and conductor 172 to the energized conductor 46. At contact members 89b, an obvious holding circuit is completed for the operating winding 89w.

It will now be understood that no further operation can take place until the next-pass switch 102 is operated, since both anti-hunting relays 89 and 90 are operated and the contact members 89a and 90a, respectively, have opened the energizing circuits for the operating windings 85w and 86w of the raise relay 85 and the lower relay 86. It has been found in practice that this sequence of operation will be effective to position the roll 11 sufficiently close to its final position so that no further movement thereof is necessary. It will be understood, however, that a suitable relay system may be provided, as desired, for extending the hunting period further.

The rolling operation at the 50 inch opening may now be carried out. While this is being done, the operator may turn the indicator 80 to a new position with respect to the scale 81 so that he will be prepared for moving the roll 11 to a new position as soon as the first pass has been completed. When this pass has been completed and the limit switch 70 has been adjusted to a new position, the next-pass switch 102 may be depressed, thereby effecting deenergization of all of the operating windings of the anti-hunting relays 87 through 90. The sequence of operation of the system will then be as described hereinbefore, and the motor 25 will this time rotate in such a direction as to initially lower the roll 11.

In the event that it is desired to initiate the operation of the motor 25 to open the rolls from the 20 inch position, the speed-opening characteristic of the movement thereof may be represented by the curve 173 which intercepts the curve 128 at the maximum speed. The sequence of deceleration to arrive at the 50 inch opening will be the same as set forth hereinbefore.

If the roll opening is at the 40 inch position and it is desired to extend it to the 50 inch position, the speed-opening relationship may be represented by the curve 174. It will be observed that the speed of the motor 25 cannot, in this instance, reach the maximum speed. However, it will be observed that it is caused to accelerate at the same rate as illustrated by the curves 128 and 173 until the deceleration part of the curves 128 and 173 is reached. This operation is due to the fact that, in the interval after the contact segment 77 has engaged the contact finger 72, the speed of operation of the screw-down motor 25 will be considerably below that corresponding to this interval and, as a result, the voltage applied to the operating winding 96w will be low. Contact members 96b will then be closed and the accelerating switch 100 will be operated to short circuit a portion of the series resistor 54.

In like manner, if it is desired to move the rolls from the 45 inch opening to the 50 inch opening, the speed-opening characteristic may be represented by the curve 175 which will intercept the deceleration portion of the preceding curves at a point such that a minimum of time will be required for moving the roll 11 from the 45 inch position to the 50 inch position.

Since certain further changes may be made in the above construction and different embodiments of the invention may be made without departing from the scope thereof, it is intended that all matter set forth in the above description or shown in the accompanying drawings, shall be interpreted as illustrative and not in a limiting sense.

I claim as my invention:

1. In a control system for rolling mills provided with a plurality of relatively movable rolls, in combination, a screw-down motor for adjusting the rolls, a limit switch presettable to different roll stopping positions, means for effecting the operation of said limit switch in accordance with the operation of the screw-down motor, means controlled by the limit switch to effect the slow-down and stopping of the screw-down motor in a predetermined position, and means controlled in accordance with the motor speed during the slow-down period for maintaining a predetermined rate of slow-down of the screw-down motor.

2. In a control system for rolling mills provided with a plurality of rolls, in combination, a screw-down motor for adjusting the rolls, a limit switch actuated in accordance with the movement of the rolls, means for starting the screw-down motor, means responsive to the limit switch for automatically decelerating and stopping the screw-down motor when the rolls are in a predetermined position, and means for maintaining the deceleration of the motor at a predetermined rate as the rolls approach said predetermined position in accordance with the distance which the rolls are from said predetermined position and the speed of the motor.

3. In a control system for rolling mills provided with a plurality of rolls, in combination, a screw-down motor for positioning the rolls, a manually operable switch for effecting the starting of the screw-down motor, presettable switch means actuated by the motor for automatically stopping the screw-down motor when the rolls are in a preselected position, and means responsive to the motor speed and the position of the presettable switch means for decelerating the motor at a predetermined rate as the rolls approach said preselected position in accordance with the distance which the rolls are from said preselected position.

4. In a control system for rolling mills provided with a plurality of relatively adjustable rolls, in combination, a screw-down motor for adjusting the rolls, a limit switch presettable to different roll stopping positions, means for effecting the operation of said limit switch in accordance with the operation of the screw-down motor, means cooperative with the limit switch to effect a predetermined rate of slow down and the stopping of the screw-down motor in a predetermined position as determined by the preset position of the limit switch, and means controlled in accordance with the speed of the motor and the distance which the rolls are from said predetermined position for increasing the rate of slow-down if it is below a predetermined rate and for decreasing the rate of slow-down if it is above a predetermined rate.

5. In a control system for rolling mills provided with a plurality of relatively adjustable rolls, in combination, a screw-down motor for adjusting the rolls, a limit switch actuated in accordance with the relative movement of the rolls and presettable to different roll stopping positions, means for starting the screw-down motor, means controlled by the limit switch for automatically decelerating and stopping the screw-down motor when the rolls are in a predetermined position as determined by the setting of the limit switch, and means jointly responsive to the motor speed and limit switch position for increasing the rate of deceleration of the motor as the rolls approach said predetermined position if the rate is below a predetermined rate and for decreasing said rate of deceleration if the rate is above a predetermined rate.

6. In a control system for rolling mills provided with a plurality of rolls, in combination, a screw-down motor for positioning the rolls relative to one another, a manually-operable switch for effecting the starting of the screw-down motor, means actuated in accordance with the relative movements of the rolls for automatically stopping the screw-down motor when the rolls are in a preselected position, said means being disposed to decelerate the motor at a predetermined rate, and means responsive to the motor speed during the period of deceleration for increasing the rate of deceleration of the motor as the rolls approach said preselected position if the rate is below a predetermined rate and for decreasing said rate of deceleration if the rate is above said predetermined rate.

7. A control system for rolling mills provided with a plurality of rolls comprising, in combination, a screw-down motor for adjusting the rolls, a limit switch disposed to be operated in accordance with the relative movement of said rolls and presettable to different roll stopping positions, means cooperative with the limit switch for effecting the operation of the motor to move the rolls to a predetermined relative position as determined by the preset position of the limit switch, means controlled by said limit switch for effecting the deceleration of the motor in successive stages at different predetermined rates in accordance with the distance the rolls are from said predetermined relative position, and means responsive to the motor speed for maintaining said predetermined rates of deceleration substantially constant throughout each successive stage.

8. A control system for rolling mills provided with a plurality of rolls comprising, in combination, a screw-down motor for adjusting the rolls, a limit switch disposed to be operated in accordance with the relative movement of said rolls, means cooperative with the limit switch for effecting the operation of the motor to move the rolls to a predetermined relative position, means controlled by said limit switch for effecting the deceleration of the motor at a predetermined rate, means for increasing the rate of deceleration of the motor if the rate is below said predetermined rate, means for decreasing the rate of deceleration of the motor if the rate is above said predetermined rate, and means jointly responsive to the speed of the motor and the position of the limit switch for controlling said means for increasing and decreasing the rate of deceleration.

9. A control system for rolling mills provided with a plurality of rolls comprising, in combination, a screw-down motor for adjusting the rolls, a limit switch disposed to be operated in accordance with the relative movement of said rolls and presettable to different roll stopping positions, means cooperative with the limit switch for effecting the operation of the motor to move the rolls to a predetermined relative position as determined by the setting of the limit switch, means controlled by said limit switch for comparing the rate of deceleration of the motor with a predetermined rate of deceleration as determined by the position of the limit switch, and means automatically responsive to an increase or decrease in the rate of deceleration of the motor above or below said predetermined rate for restoring the rate of deceleration to said predetermined rate.

10. A control system for rolling mills provided with a plurality of rolls comprising, in combination, a screw-down motor for adjusting the rolls, a limit switch disposed to be operated in accordance with the relative movement of said rolls and presettable to different roll stopping positions, means cooperative with the limit switch for effecting the operation of the motor to move the rolls to a predetermined relative position as determined by the setting of the limit switch, and means responsive to the speed of the motor above or below a predetermined speed as determined by the position of the limit switch for restoring the speed thereof to said predetermined speed.

11. A control system for rolling mills provided with a plurality of rolls comprising, in combination, a screw-down motor for adjusting the rolls, a limit switch provided with a plurality of contact fingers disposed to be movable in accordance with the relative movement of said rolls, raise and lower contact segments manually operable to engage one of said contact fingers for effecting the operation of the motor to increase or decrease the roll opening, a plurality of deceleration contact segments movable with said raise and lower contact segments, and disposed to sequentially engage the remaining contact fingers, and means controlled by the successive engagement of said deceleration contact segments with said contact fingers for decelerating the motor at a predetermined rate.

12. A control system for rolling mills provided with a plurality of rolls comprising, in combination, a screw-down motor for adjusting the rolls, a limit switch provided with a plurality of contact fingers disposed to be movable in accordance with the relative movement of said rolls, raise and lower contact segments manually operable to engage one of said contact fingers for effecting the operation of the motor to increase or decrease the roll opening, a plurality of deceleration contact segments movable with said raise and lower contact segments and disposed to sequentially engage the remaining contact fingers, means controlled by the successive engagement of said deceleration contact segments with said contact fingers for decelerating the motor at a predetermined rate, and means automatically responsive to an increase or decrease in the rate of deceleration of the motor above or below said predetermined rate for restoring the rate of deceleration to said predetermined rate.

13. A control system for rolling mills provided with a plurality of rolls comprising, in combination, a screw-down motor for adjusting the rolls, a limit switch provided with a plurality of contact fingers disposed to be movable in accordance with the relative movement of said rolls, raise and lower contact segments manually operable to engage one of said contact fingers for effecting the operation of the motor to increase or decrease the roll opening, a plurality of deceleration contact segments movable with said raise and lower contact segments and disposed to sequentially engage the remaining contact fingers, means controlled by the successive engagement of said deceleration contact segments with said contact fingers for decelerating the motor at a predetermined rate, and a speed-balance relay disposed to control the operation of the motor at different speeds each depending upon the number of deceleration contact segments in engagement with said contact fingers.

14. A control system for rolling mills provided with a plurality of rolls comprising, in combination, a screw-down motor for adjusting the rolls, a limit switch provided with a plurality of contact fingers disposed to be movable in accordance with the relative movement of said rolls, raise and lower contact segments manually operable to engage one of said contact fingers for effecting the operation of the motor to increase or decrease the roll opening, a plurality of deceleration contact segments movable with said raise and lower contact segments and disposed to sequentially engage the remaining contact fingers, means controlled by the successive engagement of said deceleration contact segments with said contact fingers for decelerating the motor at a predetermined rate, a speed-balance relay disposed to be responsive to the speed of the motor for controlling the operation thereof at different speeds each depending upon the number of deceleration contact segments in engagement with said contact fingers, and means for automatically adjusting said speed balance relay in accordance with the number of deceleration contact segments in engagement with said contact fingers.

15. A control system for rolling mills provided with a plurality of rolls comprising, in combination, a screw-down motor for adjusting the rolls, a limit switch provided with a plurality of contact fingers disposed to be movable in accordance with the relative movement of said rolls, raise and lower contact segments manually operable to engage one of said contact fingers for effecting the operation of the motor to increase or decrease the roll opening, a plurality of deceleration contact segments movable with said raise and lower contact segments and disposed to sequentially engage the remaining contact fingers, means controlled by the successive engagement of said deceleration contact segments with said contact fingers for decelerating the motor at a predetermined rate, means for increasing the speed of the motor, means for decreasing the speed of the motor, a speed-balance relay disposed to control the functioning of the speed control means to maintain the operation of the motor at different speeds each depending upon the number of deceleration contact segments in engagement with said contact fingers, and means for automatically adjusting said speed-balance relay in accordance with the number of deceleration contact segments in engagement with said contact fingers.

16. A control system for rolling mills provided with a plurality of rolls comprising, in combination, a screw-down motor for adjusting the rolls, a limit switch provided with a plurality of contact fingers disposed to be movable in accordance with the relative movement of said rolls, raise and lower contact segments manually operable to engage one of said contact fingers for effecting the operation of the motor to increase or decrease the roll opening, a plurality of deceleration contact segments movable with said raise and lower contact segments and disposed to sequentially engage the remaining contact fingers, means controlled by the successive engagement of said deceleration contact segments with said contact fingers for decelerating the motor at a predetermined rate, means for increasing the speed of the motor, means for decreasing the speed of the motor, a speed-balance relay provided with contact means individual to each of said speed control means for effecting the operation of either, means for biasing said relay to effect the operation of said speed control means for increasing the speed of the motor, an operating winding in said relay disposed to oppose the action of said biasing means and to effect the operation of said speed control means for decreasing the speed of the motor, means for generating a voltage proportional to the speed of the motor for energizing said operating winding, and means for maintaining the voltage applied to said operating winding at substantially a predetermined value with reduction in speed of the motor.

17. A control system for rolling mills provided with a plurality of rolls comprising, in combination, a screw-down motor having an armature for adjusting the rolls, a series resistor disposed to be connected in series circuit relation with said armature, a switch for shunting a portion of said series resistor, a shunt resistor disposed to be connected in shunt circuit relation with said armature, a second switch for shunting a portion of said shunt resistor, a limit switch provided with a plurality of contact fingers disposed to be movable in accordance with the relative movement of said rolls, raise and lower contact segments manually operable to engage one of said contact fingers for effecting the operation of the motor to increase or decrease the roll opening, a plurality of deceleration contact segments movable with said raise and lower contact segments and disposed to sequentially engage the remaining contact fingers, means controlled by the first engagement of said deceleration contact segments with said contact fingers for connecting said series and shunt resistors in circuit with the armature to operate the motor at a predetermined speed and by the successive engagement of said deceleration contact segments with said contact fingers for reducing the resistance in shunt circuit relation with the armature to operate the motor at correspondingly lower speeds a speed-balance relay disposed to be responsive to the speed of the motor for effecting the operation of either of said resistance shunting switches depending upon whether the speed of the motor is above or below that corresponding to the number of deceleration contact segments in engagement with said contact fingers, and means for automatically adjusting said speed balance relay in accordance with the number of deceleration contact segments in engagement with said contact fingers.

WILLARD G. COOK.